United States Patent
Hirata et al.

(10) Patent No.: US 11,012,656 B2
(45) Date of Patent: May 18, 2021

(54) GAS DETECTION DEVICE, INFORMATION PROCESSING DEVICE, AND PROGRAM

(71) Applicant: KONICA MINOLTA, INC., Chiyoda-ku (JP)

(72) Inventors: Saori Hirata, Chiyoda-ku (JP); Mei Yamasaki, Chiyoda-ku (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/291,250

(22) Filed: Mar. 4, 2019

(65) Prior Publication Data
US 2020/0059623 A1 Feb. 20, 2020

(30) Foreign Application Priority Data

Aug. 20, 2018 (JP) .............................. JP2018-153947

(51) Int. Cl.
| | |
|---|---|
| *H04N 5/00* | (2011.01) |
| *H04N 5/445* | (2011.01) |
| *H04N 5/247* | (2006.01) |
| *G01M 3/38* | (2006.01) |
| *G06T 3/00* | (2006.01) |
| *H04N 5/265* | (2006.01) |

(52) U.S. Cl.
CPC .......... *H04N 5/44504* (2013.01); *G01M 3/38* (2013.01); *G06T 3/0068* (2013.01); *H04N 5/247* (2013.01); *H04N 5/265* (2013.01)

(58) Field of Classification Search
CPC ... H04N 5/44504; G01M 3/00; G06T 3/0068; G06T 3/00
See application file for complete search history.

(56) References Cited

U.S. PATENT DOCUMENTS

| | | | | |
|---|---|---|---|---|
| 5,430,293 A | * | 7/1995 | Sato ........................ | G01M 3/38 250/330 |
| 5,656,813 A | * | 8/1997 | Moore ............... | G01N 21/3504 250/330 |
| 2001/0046316 A1 | * | 11/2001 | Miyano ................ | A61B 5/7425 382/154 |

(Continued)

FOREIGN PATENT DOCUMENTS

| | | |
|---|---|---|
| JP | S 61-76925 | 4/1986 |
| JP | 2005-037366 | 2/2005 |

(Continued)

*Primary Examiner* — Dave Czekaj
*Assistant Examiner* — Shanika M Brumfield
(74) *Attorney, Agent, or Firm* — Cozen O'Conner

(57) ABSTRACT

Provided are a gas detection device, an information processing device, and a program which enable a user to accurately estimate a gas leak position. The gas detection device includes a hardware processor that causes a display screen to display a first image captured by a first imaging section and a second image captured by a second imaging section, and changes at least one of a first display position of a specific position included in the first image and a second display position of the specific position included in the second image on the display screen. The hardware processor causes the display screen to display the first display position and the second display position so that the first display position and the second display position can be compared with each other so as to recognize a difference between the first display position and the second display position.

7 Claims, 4 Drawing Sheets

(56) References Cited

U.S. PATENT DOCUMENTS

| | | | | |
|---|---|---|---|---|
| 2002/0105514 | A1* | 8/2002 | Roche, Jr. | H04N 13/133 |
| | | | | 345/419 |
| 2009/0050806 | A1* | 2/2009 | Schmidt | H04N 5/2258 |
| | | | | 250/332 |
| 2011/0249014 | A1* | 10/2011 | Kolstad | H04N 5/332 |
| | | | | 345/589 |
| 2012/0314080 | A1* | 12/2012 | Lee | G01M 3/002 |
| | | | | 348/159 |
| 2015/0304636 | A1* | 10/2015 | Rhead | H04N 5/332 |
| | | | | 348/46 |
| 2020/0397266 | A1* | 12/2020 | Hufford | A61B 1/00039 |

FOREIGN PATENT DOCUMENTS

| | | |
|---|---|---|
| JP | 2017-199982 | 11/2017 |
| WO | WO 2012/073722 | 6/2012 |
| WO | WO 2016/143754 | 9/2016 |

* cited by examiner

GAS DETECTION DEVICE, INFORMATION PROCESSING DEVICE, AND PROGRAM

CROSS REFERENCE TO RELATED APPLICATIONS

The entire disclosure of Japanese patent Application No. 2018-153947 filed on Aug. 20, 2018, is incorporated herein by reference in its entirety.

BACKGROUND

Technological Field

The present invention relates to a gas detection device, an information processing device, and a program.

Description of Related Art

For example, WO 2016/143754 discloses a gas detection device that estimates a gas leak position by capturing an image in an infrared region that is influenced by light absorption by gas.

In this gas detection device, a gas is automatically detected from an infrared image, and a superimposed image on which a gas image detected as a gas on an image captured by visible light is superimposed is displayed. Accordingly, a used can easily recognize a gas distribution region or a gas leak position by viewing the superimposed image.

Incidentally, in the gas detection device disclosed in WO 2016/143754, the position of an infrared camera that captures an image of an imaging target in the infrared region is different from the position of visible light camera that captures an image of the imaging target by visible light. As a result, a disparity occurs between the visible image captured by visible light and the gas image detected as a gas, visible image, which makes it difficult to superimpose the gas image at an accurate position on the visible image. This causes a problem that the gas leak position cannot be accurately estimated by a user who has viewed the displayed superimposed image. Although a parameter for eliminating the disparity can be used, the amount of disparity varies depending on, for example, the distance between the gas detection device and the imaging target. For this reason, a certain parameter cannot be used.

SUMMARY

An object of the present invention is to provide a gas detection device, an information processing device, and a program which enable a user to accurately estimate a gas leak position. To achieve at least one of the abovementioned objects, according to an aspect of the present invention, a gas detection device reflecting one aspect of the present invention comprises:

a first imager configured to capture an image of an imaging target in an infrared region that is influenced by light absorption by gas;

a second imager configured to capture an image of the imaging target in a wavelength range that is not influenced by light absorption by gas; and a hardware processor configured to cause a display screen to display a first image captured by the first imager and a second image captured by the second imager, and to change at least one of a first display position of a specific position included in the first image and a second display position of the specific position included in the second image on the display screen, wherein the hardware processor causes the display screen to display the first display position and the second display position in such a manner the first display position and the second display position are comparable with each other in order that a difference between the first display position and the second display position is recognizable.

To achieve at least one of the abovementioned objects, according to an aspect of the present invention, an information processing device, reflecting one aspect of the present invention comprises:

a hardware processor configured to cause a display screen to display a first image of an imaging target captured in an infrared region that is influenced by light absorption by gas, and a second image of the imaging target captured in a wavelength range that is not influenced by light absorption by gas, and change at least one of a first display position of a specific position included in the first image and a second display position of the specific position included in the second image on the display screen, wherein the hardware processor causes the display screen to display the first display position and the second display position in such a manner that the first display position and the second display position are comparable with each other in order that a difference between the first display position and the second display position is recognizable. To achieve at least one of the abovementioned objects, according to an aspect of the present invention, a program reflecting one aspect of the present invention is a program causing a computer to function as an entire or part of the hardware processor of the information processing device.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Gas detection device 1 according to an embodiment of the present invention will be described below with reference to the drawings.

Figure 1:
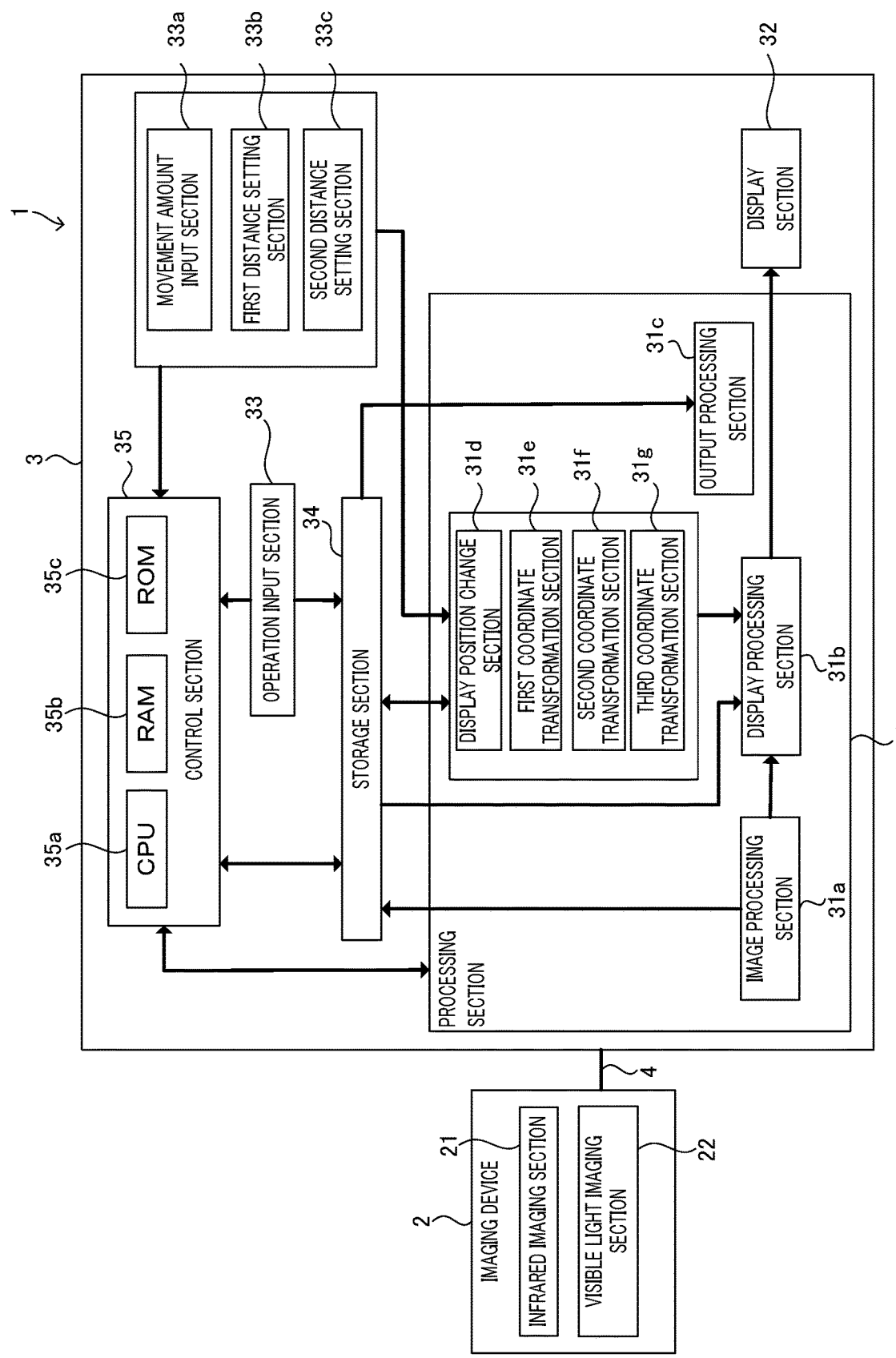
FIG. 1 is a block diagram illustrating a configuration example of a gas detection device according to an embodiment of the present invention.

FIG. 1 is a block diagram illustrating gas detection device 1. Gas detection device 1 captures, for example, an inspection region including inspection target (a plant or the like) in gas production facilities. Further, gas detection device 1 performs image processing for detecting a gas on the captured image.

As illustrated in FIG. 1, gas detection device 1 includes imaging device 2 and gas detection device body 3. Imaging device 2 and gas detection device body 3 are connected via cable 4. Imaging device 2 may be connected to gas detection device body 3 via wireless communication. Imaging device 2 may also be connected to gas detection device body 3 via a network such as the Internet.

Imaging device 2 is, for example, a portable camera device. Imaging device 2 may be a camera device that is fixed to a predetermined position. Imaging device 2 may be controlled by, for example, control section 35 of gas detection device body 3 to be described below, and a controller (not illustrated) or the like included in imaging device 2.

Imaging device 2 starts imaging, for example, when an instruction to start imaging is input from a user through operation input section 33 of gas detection device body 3. Even in the case where the instruction to start imaging is input, imaging device 2 may not start imaging when shooting information to be described below is not input from the user.

Specifically, imaging device 2 includes infrared imaging section 21 and visible light imaging section 22.

<Infrared Imaging Section>

Infrared imaging section 21 includes a first optical system (not illustrated), a first optical filter (not illustrated), and an infrared sensor (not illustrated).

The first optical system focuses infrared light incident from the inspection region serving as an object on the infrared sensor.

The first optical filter is a bandpass filter or the like disposed on an optical path connecting the first optical system and the infrared sensor. The first optical filter transmits only the infrared light included in a predetermined wavelength band in the infrared light which has passed through the optical system. The pass wavelength band of the first optical filter is substantially set to an absorption wavelength band of a gas to be detected. For example, when the pass wavelength band is set to a middle wavelength range of 3.2 to 3.4 µm, a methane gas or the like can be detected.

The infrared sensor is, for example, a quantum indium antimonide (InSb) image sensor, a heat-type thermopile array sensor, or a microbolometer, and receives infrared light to generate infrared image data. Infrared imaging section 21 having such a configuration captures an image of the inspection region in a state of being synchronized with visible light imaging section 22, and sequentially outputs infrared image data to processing section 31 (specifically, image processing section 31*a*).

The infrared image data generated by infrared imaging section 21 includes data on a still image and a moving image.

<Visible Light Imaging Section>

Visible light imaging section 22 includes a second optical system (not illustrated), a second optical filter (not illustrated), and a visible light sensor (not illustrated).

The second optical filter is an infrared cut filter or the like disposed on an optical path connecting the optical system and the visible light sensor. The infrared cut filter cuts infrared light from the light which has passed through the optical system.

The visible light sensor is, for example, a Complementary Metal Oxide Semiconductor (CMOS) image sensor, and receives black-and-white BW visible light, or color RGB visible light to generate visible image data.

Visible light imaging section 22 having such a configuration captures, for example, an image of the inspection region including the inspection target (e.g., plant 6*a* illustrated in FIG. 2) in gas production facilities, and sequentially outputs visible image data to processing section 31 (specifically, image processing section 31*a*).

The visible image data generated by visible light imaging section 22 includes data on a still image and a moving image.

<Gas Detection Device Body>

Gas detection device body 3 converts a gas generated in the inspection region into a visible image by using received information (infrared image data) from imaging device 2. Gas detection device body 3 having such a configuration is a mobile terminal such as a tablet terminal, a smartphone, a laptop terminal, or a wearable terminal, which is communicably connected to imaging device 2.

Gas detection device body 3 includes processing section 31, display section 32, operation input section 33, storage section 34, and control section 35.

<Processing Section>

Processing section 31 is composed of at least one dedicated hardware (electronic circuit) such as a digital signal processor (DSP), an application specific integrated circuit (ASIC), or a programmable logic device (PLD). Processing section 31 includes, as functional blocks, image processing section 31*a*, display processing section 31*b*, output processing section 31*c*, display position change section 31*d*, first coordinate transformation section 31*e*, second coordinate transformation section 31*f*, and third coordinate transformation section 31*g*. Each function of processing section 31 to be described below is implemented under control of control section 35.

<Image Processing Section>

The function of image processing section 31*a* will be described below.

Image processing section 31*a* receives infrared image data on the inspection region from infrared imaging section 21.

Image processing section 31*a* performs predetermined image processing for detecting a gas in the infrared image data on the inspection region.

Image processing section 31*a* detects, for example, a portion in which a gas is present in the infrared image data, and converts the detected portion into a visible image to thereby generate gas image data. Image processing section 31*a* applies a specific color (red or the like) to the portion in which a gas is present in the infrared image data.

Image processing section 31*a* receives visible image data from visible light imaging section 22. Further, image processing section 31*a* generates test image data by combining the visible image data with the gas image data.

Image processing section 31*a* outputs the test image data to display processing section 31*b* and storage section 34. The test image data is displayed on display section 32 as test image 7 (see FIG. 2). The specific color is applied to gas image 7*a* (see FIG. 2) corresponding to the gas in test image 7.

Image processing section 31*a* receives the visible image data on the inspection region from visible light imaging section 22. Image processing section 31*a* outputs the visible image data to display processing section 31*b* and storage section 34.

<Display Processing Section>

The function of display processing section 31*b* will be described below. The function of display processing section 31*b* is implemented under control of control section 35.

Display processing section 31b having such a configuration controls the display of display section 32 to be described below.

Display processing section 31b causes display section 32 to display an imaging information input image (not illustrated) for inputting imaging information. In this case, the imaging information includes various information necessary for starting imaging by imaging device 2. For example, the imaging information includes a client identification (ID), a user ID, the name of an examiner, the name of an inspection company, date and time of inspection, an inspection type, a site name, a facility name, a facility ID, and latitude and longitude measured by a Global Positioning System (GPS). Image data based on which the imaging information input image is obtained is preliminarily stored in storage section 34.

Figure 2:
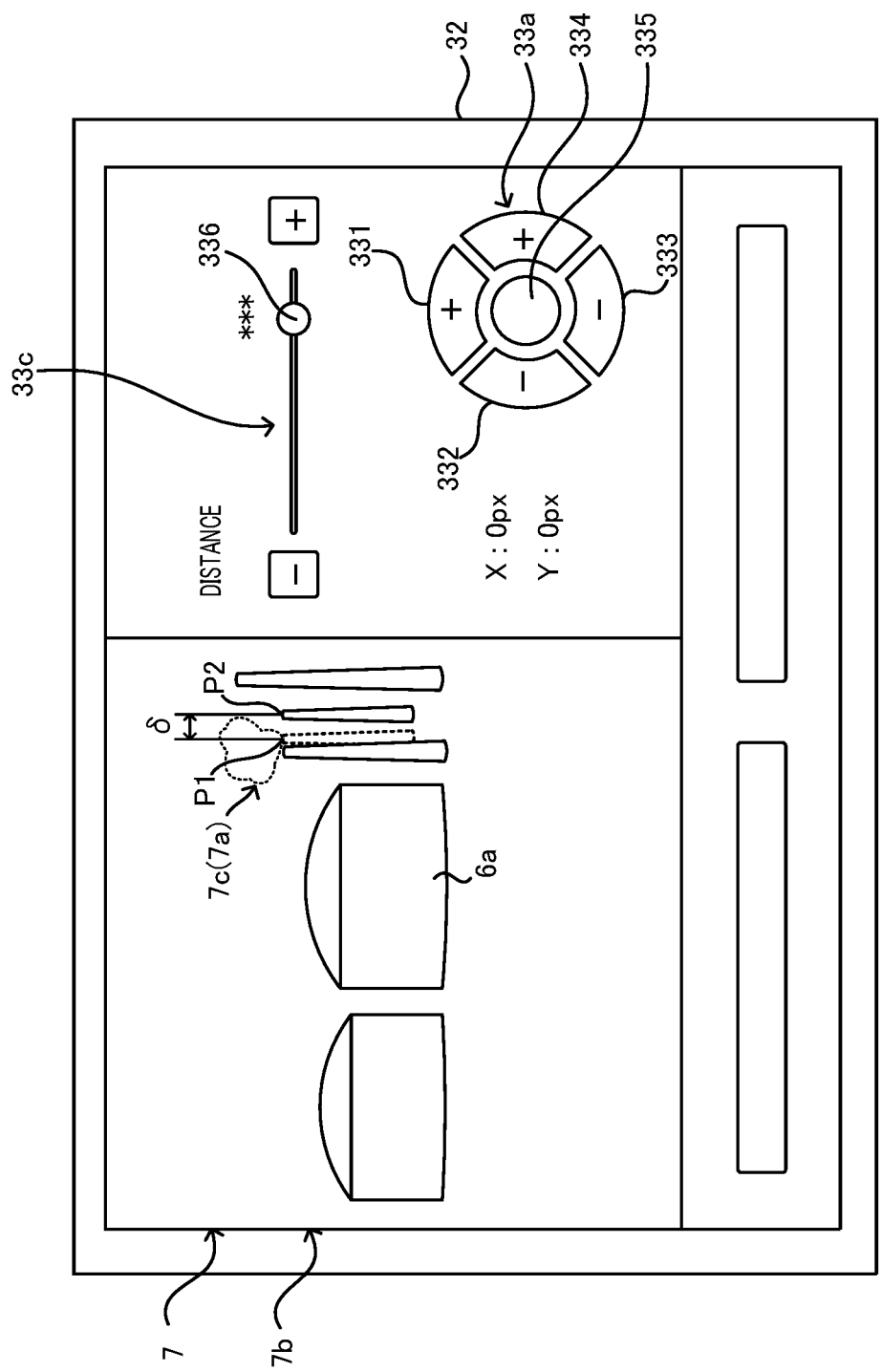
FIG. 2 is a diagram illustrating an example of a screen displayed on a display section during main setting of a coordinate transformation parameter.

Display processing section 31b converts the test image data received from image processing section 31a into a display signal corresponding to display section 32, outputs the display signal, and causes display section 32 to display test image 7 (see FIG. 2).

<Output Processing Section>

Output processing section 31c generates output information including the test image data under control of control section 35. Output processing section 31c generates output information when an output instruction is input from operation input section 33.

Output processing section 31c outputs the output information to, for example, a portable storage medium such as an optical disk, a magneto-optical disk, or a memory card. An output device may be connected to gas detection device body 3 via a wire, or may be wirelessly connected to gas detection device body 3. The output device may also be connected to gas detection device body 3 via a network such as the Internet.

Further, when gas detection device 1 is connected to a server via a network, output processing section 31c may output the output information to the server.

<Control Section>

Control section 35 includes central processing unit (CPU) 35a as a calculation/control device, random access memory (RAM) 35b, and read only memory (ROM) 35c as a main storage device. ROM 35c stores basic programs and basic setting data. CPU 35a reads out programs depending on the processing content from ROM 35c or storage section 34, loads the programs into RAM 35b, and executes the loaded programs, thereby controlling the operation of each block of gas detection device 1 in a centralized manner. Control section 35 having such a configuration controls imaging device 2, display section 32, operation input section 33, and storage section 34 depending on their functions, thereby controlling the entire gas detection device 1.

In the present embodiment, the hardware pieces constituting the functional blocks and control section 35 cooperate with each other to thereby implement the functions of each functional block. Some or all the function of each functional block may be implemented in such a manner that control section 35 executes programs.

<Storage Section>

Storage section 34 is an auxiliary storage device such as a nonvolatile semiconductor memory (a so-called flash memory) or a hard disk drive. Storage section 34 may be a disk drive for reading and writing information by driving an optical disk such as a compact disc (CD) or a digital versatile disc (DVD), or a magneto-optical disk (MO). Further, for example, storage section 34 may be a memory card such as a Universal Serial Bus (USB) memory or a Secure Digital (SD) card.

Storage section 34 stores imaging information input from operation input section 33. Writing of data into storage section 34 and reading of data from storage section 34 are controlled by control section 35.

<Operation Input Section>

Operation input section 33 is an input section that receives an input of, for example, imaging information. Further, operation input section 33 receives an operation associated with imaging by imaging device 2, and an operation associated with reproduction of test image data.

Operation input section 33 receives an output instruction to output information about imaging. Operation input section 33 may receive, for example, the designation of items included in the output information, together with the output instruction. The items of the output information include imaging information and any other information (e.g., weather information during imaging).

In the present embodiment, operation input section 33 is composed of a flat panel display with a touch panel that is integrally provided with display section 32. The user can perform an input of imaging information, an operation of imaging device 2, and a test image data reproduction operation through operation input section 33.

Operation input section 33 is not limited to a flat display with a touch panel, but instead may be, for example, an input device such as a keyboard, a mouse, or a microphone.

<Display Section>

Display section 32 is, for example, a display of a mobile terminal constituting gas detection device body 3. As the display, a liquid crystal display, an organic EL display, or the like can be used. In the present embodiment, the display is a flat panel display with a touch panel.

Display section 32 displays an image based on a display signal from display processing section 31b (see FIG. 1) under control of control section 35. Specifically, display section 32 displays test image 7 (see FIG. 2) for detecting a gas by visual observation by the user.

Incidentally, since the position of infrared imaging section 21 is different from the position of visible light imaging section 22, in the case of generating test image data simply by combining visible image data with gas image data extracted from infrared image data, a disparity occurs between display positions of a common specific position included in each of gas image 7a (see FIG. 2) and visible image 7b (see FIG. 2). Gas image 7a cannot be superimposed at an accurate position on visible image 7b due to the disparity. Accordingly, the user who has viewed the detected image 7 (see FIG. 2) which is the displayed superimposed image cannot accurately estimate a gas leak position in some cases. The amount of disparity varies depending on the distance between gas detection device 1 and the imaging target, and thus a certain parameter cannot be used. Portable gas detection device 1 creates a plurality of parameters for each distance and uses the parameters depending on the distance between gas detection device 1 and the imaging target, thereby coping with a variation in the amount of disparity. When the difference between the distance between the distance between gas detection device 1 and the imaging target and the distance set when a parameter is created is small, the parameter can be used. However, when the difference between the distances is large, a disparity corresponding to the difference between the distances for each pixel occurs (the distance of the entire pixels within an angle of view is not uniform due to a three-dimensional object used as the imaging target, or a tilt angle of imaging device 2, so that a disparity depending on the distance occurs). Thus, a fine adjustment may be required to match specific positions. When the fine adjustment is insufficient, gas image 7a cannot be superimposed at an accurate position on visible image 7b. Accordingly, the user cannot accurately estimate a gas leak position in some cases.

To accurately estimate a gas leak position, it is necessary to decrease the difference between a first display position of a specific position included in gas image 7a and a second display position of the specific position included in visible image 7b.

Accordingly, gas detection device 1 according to the present embodiment includes display position change section 31d, first coordinate transformation section 31e, second coordinate transformation section 31f, third coordinate transformation section 31g, movement amount input section 33a, first distance setting section 33b, and second distance setting section 33c.

Display position change section 31d changes at least one of first display position P1 (see FIG. 2) of a specific position included in one of gas image 7a and infrared image 7c (each of which corresponds to a "first image" according to the present invention) and second display position P2 (see FIG. 2) of the specific position included in visible image 7b (corresponding to a "second image" according to the present invention). In the present embodiment, display position change section 31d changes first display position P1 with respect to second display position P2.

In the present embodiment, preliminary setting of a first coordinate transformation matrix ("first coordinate transformation parameter" according to the present invention) and main setting of a second coordinate transformation matrix ("second coordinate transformation parameter" according to the present invention) are carried out. The coordinate transformation matrix used herein refers to a matrix for performing transformation on each of a parallel movement of three-dimensional coordinates of an image in each of an X-axis, a Y-axis, and a Z-axis, a rotation about each of the X-axis, the Y-axis, and the Z-axis at the coordinates, and scaling (enlargement and/or reduction) about the X-axis, the Y-axis, and the Z-axis. First coordinate transformation section 31e transforms the coordinates of infrared image 7c by using the first coordinate transformation matrix in such a manner that the difference between a third display position of a specific position included in infrared image 7c and a fourth display position of the specific position included in visible image 7b decreases. Infrared image 7c corresponds to the "first image" of the present invention, like gas image 7a. This is because, since the gas image data is image data extracted from the infrared image data, the transformation of the coordinates of infrared image 7c means the transformation of the coordinates of gas image 7a.

Storage section 34 stores the first coordinate transformation matrix in association with a first distance (to be described below).

Second coordinate transformation section 31f transforms the coordinates of infrared image 7c or gas image 7a by using the second coordinate transformation matrix. The second coordinate transformation matrix further performs position transformation on the image transformed by first coordinate transformation section 31e. The position transformation used herein refers to position transformation corresponding to the amount change when display position change section 31d changes first display position P1 with respect to second display position P2.

Third coordinate transformation section 31g performs coordinate transformation on infrared image 7c and gas image 7a by using a third coordinate transformation matrix obtained by combining the first coordinate transformation matrix and the second coordinate transformation matrix.

Movement amount input section 33a (control button illustrated in FIG. 2) receives a movement amount of first display position P1. Movement amount input section 33a includes plus buttons 331 and 334 and minus buttons 332 and 333 which are arranged in a circumferential direction. Plus buttons 331 and 334 are buttons for inputting the movement amount in each of an upward direction and a rightward direction in FIG. 2. Minus buttons 332 and 333 are buttons for inputting the movement amount in each of a leftward direction and a downward direction in FIG. 2. At a central portion surrounded by plus buttons 331 and 334 and minus buttons 332 and 333, button 335 for switching a display mode for temporally alternately displaying infrared image 7c and visible image 7b and a display mode for displaying only one of infrared image 7c and visible image 7b without alternately displaying the images is disposed. Instead of alternately displaying infrared image 7c and visible image 7b, gas image 7a and visible image 7b may be alternately displayed.

The user inputs the movement amount in the direction of at least one of the X-axis and the Y-axis through movement amount input section 33a so as to decrease a difference δ. The X-axis direction described herein refers to a left-right direction of an image, and the Y-axis direction described herein refers to an up-down direction of an image. The movement amount in the Z-axis direction which is perpendicular to the image may be input. Display position change section 31d changes first display position P1 on display screen 32a based on the movement amount received by movement amount input section 33a.

First distance setting section 33b sets the first distance between gas detection device 1 and the imaging target. The first distance is measured by a known means.

Second distance setting section 33c (slide bar illustrated in FIG. 2) sets a second distance between gas detection device 1 and the inspection target. Second distance setting section 33c includes slider 336 indicating a display position on a bar as the second distance. The setting of the second distance is set by the user. The second distance may be measured by a known means.

<Preliminary Setting of First Coordinate Transformation Matrix>

Figure 3:
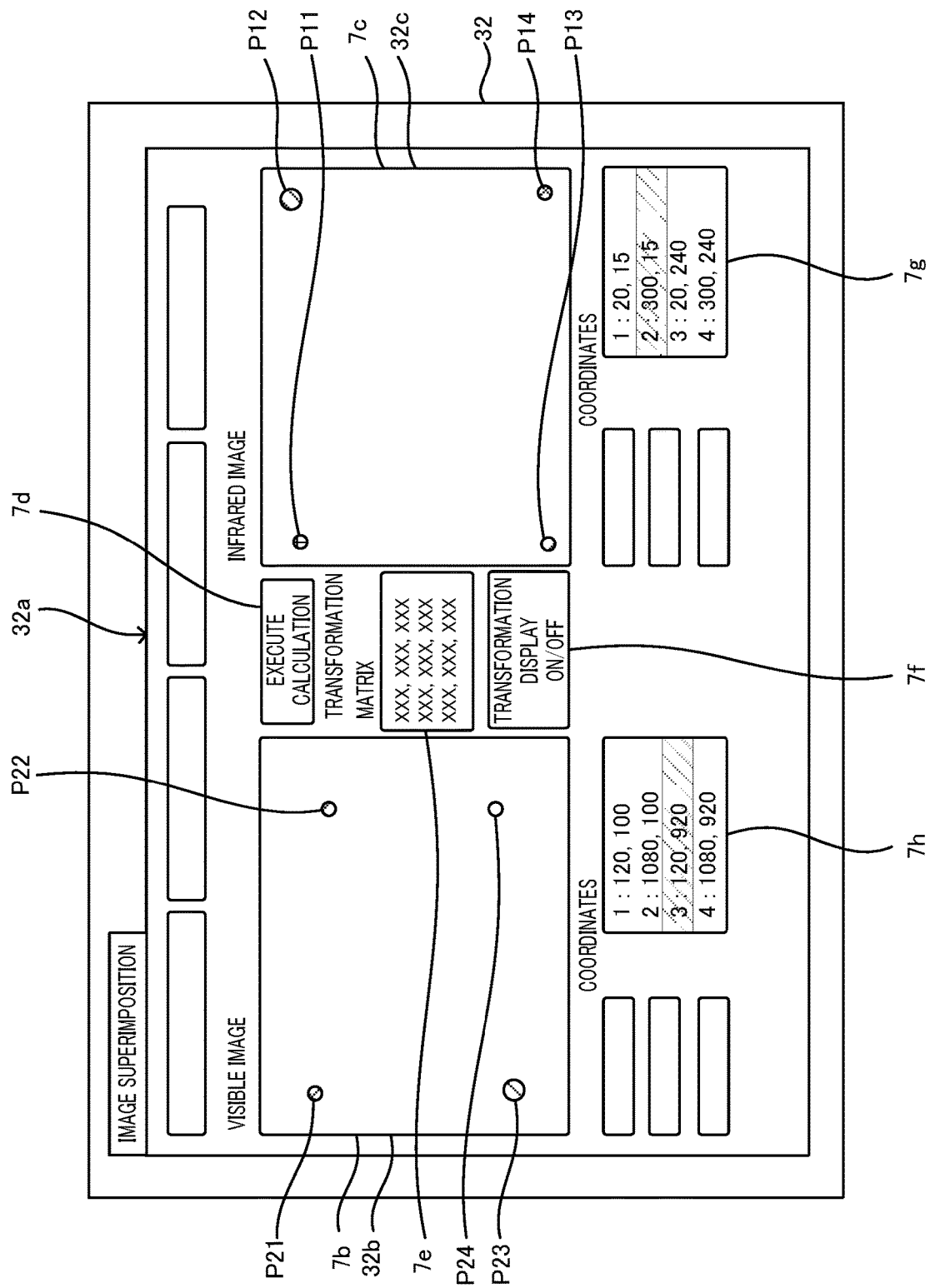
FIG. 3 is a diagram illustrating an example of the screen displayed on the display section during preliminary setting of the coordinate transformation parameter.

FIG. 3 is a diagram illustrating an example of display screen 32a displayed on display section 32 when preliminary setting of the first coordinate transformation matrix is carried out. As illustrated in FIG. 3, image display screen 32c is disposed on the right side of display screen 32a. Image display screen 32b is disposed on the left side of display screen 32a. Between right-side image display screen 32c and left-side image display screen 32b, calculation execution button 7d, coordinate transformation matrix display section 7e, and button 7f for switching ON/OFF of the transformation display are disposed. Coordinate display section 7g is disposed below right-side image display screen 32c. Coordinate display section 7h is disposed below left-side image display screen 32b.

The user captures an image of the imaging target spaced apart from imaging device 2 by the first distance. As illustrated in FIG. 3, image display screen 32c displays infrared image 7c of the imaging target captured by infrared imaging section 21. Image display screen 32b displays visible image 7b of the imaging target captured by visible light imaging section 22. The right-left direction in FIG. 3 refers to an X-axis direction of each of infrared image 7c and visible image 7b. The up-down direction in FIG. 3 refers to a Y-axis direction of each image. In the drawings, a direction orthogonal to a drawing sheet is referred to as a Z-axis direction of each image.

The user inputs display positions P11, P12, P13, and P14 (hereinafter referred to as display position P11 and the like) which are four feature points included in infrared image 7c through operation input section 33. Coordinate display section 7g displays coordinates of input display position P11 and the like. Further, the user inputs display positions P21, P22, P23, and P24 (hereinafter referred to as display position P21 and the like) which are four feature points (feature points common to the feature points of infrared image 7c) included in visible image 7b through operation input section 33. Coordinate display section 7h displays coordinates of input display position P21 and the like. Display position P11 and the like on image display screen 32c are set to a position at 70 to 80 percent of the image height. Similarly, display position P21 and the like on image display screen 32b are set to a position at 70 to 80 percent of the image height.

First coordinate transformation section 31e transforms the coordinates of infrared image 7c by using the first coordinate transformation matrix in such a manner that display positions P11, P12, P13, and P14 match display positions P21, P22, P23, and P24, respectively. Coordinate transformation matrix display section 7e displays the first coordinate transformation matrix obtained before the coordinate transformation by first coordinate transformation section 31e. Coordinate transformation matrix display section 7e displays the first coordinate transformation matrix obtained after the coordinate transformation by first coordinate transformation section 31e. When button 7f is pressed, display processing section 31b switches display screen 32a between a transformation display mode and a non-transformation display mode. Storage section 34 stores the first coordinate transformation matrix used for the first distance in association with the first distance.

Similarly, first coordinate transformation section 31e transforms the coordinates of infrared image 7c at various types of first distances in such a manner that display positions P11, P12, P13, and P14 match display positions P21, P22, P23, and P24, respectively, by using the first coordinate transformation matrix. Specifically, first coordinate transformation section 31e transforms the coordinates of infrared image 7c at five types of first distances (e.g., 1 m, 5 m, 10 m, 15 m, and 20 m). Storage section 34 stores the first coordinate transformation matrix used for each first distance in association with the respective first distances. The first coordinate transformation matrix is preliminarily stored in storage section 34 before the user uses gas detection device 1.

<Main Setting of Coordinate Transformation Matrix>

Prior to inspection of a gas leakage, the user moves second distance setting section 33c (slide bar illustrated in FIG. 2) on a screen for setting a transformation parameter for correcting a disparity, and sets the second distance between gas detection device 1 and the inspection target (shooting target). If the distance that matches the second distance is not included in various types of first distances stored in storage section 34, the first coordinate transformation matrix for the first distance closest to the second distance may be used as the second coordinate transformation matrix. Alternatively, the first transformation matrix interpolated with the first coordinate transformation matrix for two first distances before and after the second distance may be used.

The user captures an image of the inspection region including the inspection target by infrared imaging section 21 and visible light imaging section 22. Display processing section 31b causes display section 32 to temporally alternately display visible image 7b and infrared image 7c transformed by first coordinate transformation section 31e. In this case, infrared image 7c transformed by first coordinate transformation section 31e is displayed, but instead gas image 7a transformed by first coordinate transformation section 31e may be displayed. Gas image 7a, which is image data on a gas cloud detected from infrared image 7c, is equivalent to infrared image 7c transformed by first coordinate transformation section 31e.

First coordinate transformation section 31e transforms the coordinates of infrared image 7c by using the first coordinate transformation matrix, thereby making it possible to decrease the difference δ (see FIG. 2) between first display position P1 and second display position P2 of the common specific position included in each of infrared image 7c and visible image 7b that is caused due to a disparity. FIG. 2 is an enlarged view so as to facilitate illustration of the difference δ between first display position P1 and second display position P2. FIG. 2 illustrates visible image 7b and infrared image 7c which are temporally alternately displayed are superimposed for convenience of illustration. A solid line indicates visible image 7b, and a broken line indicates infrared image 7c.

The disparity at a specific distance is eliminated by coordinate transformation by first coordinate transformation section 31e. However, since the distance of all pixels within the angle of view is not uniform due to a three-dimensional object used as the imaging target, or a tilt angle of imaging device 2, the coordinate transformation by first coordinate transformation section 31e may be insufficient to correct the parity. In FIG. 2, the distance of only the chimney at the center of the three chimneys is different, so that a deviation due to a disparity occurs. There is a demand for accurately estimating a gas leak position by further decreasing the difference δ. Therefore, main setting of the second coordinate transformation matrix is carried out.

Display processing section 31b displays first display position P1 of a specific position included in infrared image 7c and second display position P2 of the specific position (position common to the specific position in infrared image 7c) included in visible image 7b in such a manner that the images can be compared with each other. Specifically, display processing section 31b temporally alternately displays infrared image 7c and visible image 7b. The alternate display cycle can be arbitrarily set as long as a positional deviation can be recognized by switching of images. The alternate display cycle is, for example, 0.5 to 30 times (0.5 to 30 fps) per second.

Display position change section 31d changes first display position P1 on display screen 32a based on the movement amount received by movement amount input section 33a.

Second coordinate transformation section 31f creates the second coordinate transformation matrix based on the amount of change by display position change section 31d.

Second coordinate transformation section 31f transforms the coordinates of infrared image 7c by using the created second coordinate transformation matrix so as to match first display position P1 with second display position P2.

Figure 4:
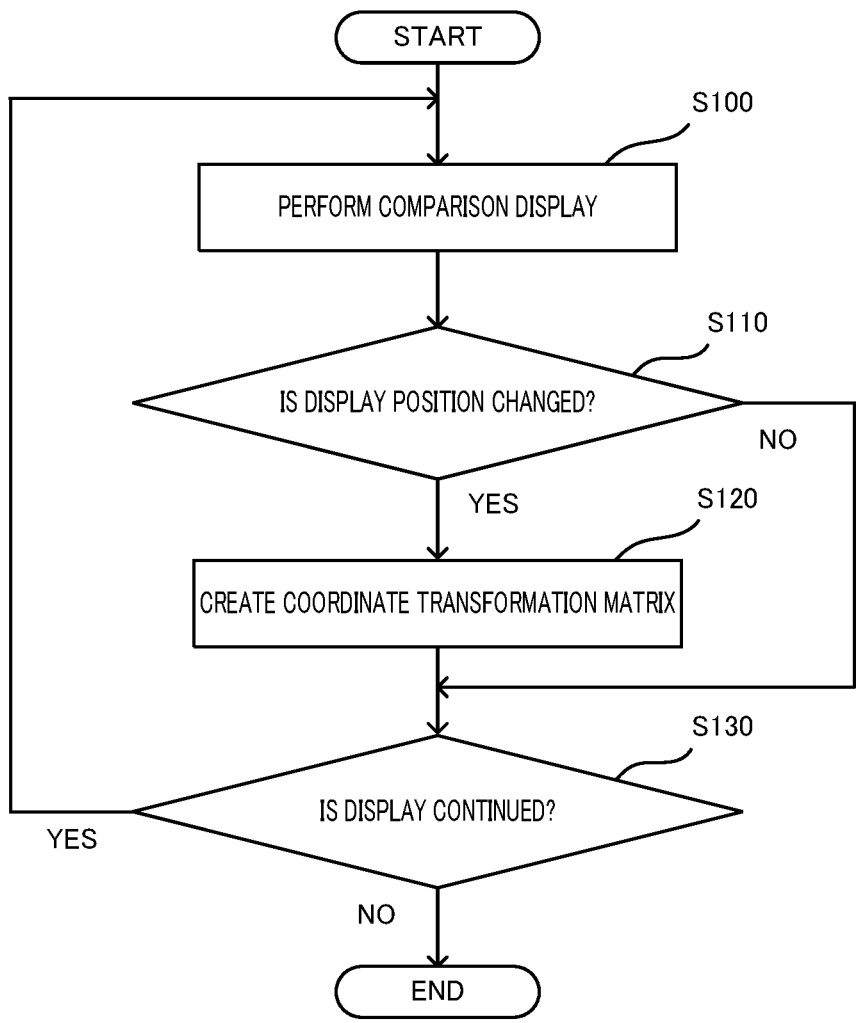
FIG. 4 is a flowchart illustrating an example of a main setting operation for the coordinate transformation parameter.

Next, the operation of main setting of the coordinate transformation matrix will be described with reference to FIG. 4. FIG. 4 is a flowchart illustrating an example of the operation of main setting of the coordinate transformation parameter. This flow is started after the inspection region is captured by imaging device 2.

First, in step S100, display processing section 31b displays first display position P1 of a specific position included in infrared image 7c and second position P2 of the specific position included in visible image 7b in such a manner that the images can be compared with each other.

Next, in step S110, processing section 31 determines whether display position change section 31d has changed first position P1. If first position P1 is changed (YES in step S110), the processing shifts to step S120. If first position P1 is not changed (NO in step S110), the processing shifts to step S130.

In step S120, second coordinate transformation section 31f creates the second coordinate transformation matrix based on the amount of change of first display position P1 by display position change section 31d.

Next, in step S130, processing section 31 determines whether the display of display section 32 is continued. If the display is continued (YES in step S130), the processing returns to a step before step S100. If the display is not continued (NO in step S130), the processing ends.

When the movement amount (transformation amount) is determined, the third coordinate transformation matrix which is a combination of the first coordinate transformation matrix and the second coordinate transformation matrix is stored in storage section 34. Visible image 7b captured by visible light imaging section 22, infrared image 7c captured by infrared imaging section 21, and gas image 7a subjected to image processing by image processing section 31a are subjected to coordinate transformation by third coordinate transformation section 31g and are stored in storage section 34. Test image 7, which is a combination of visible image 7b and gas image 7a subjected to coordinate transformation, is also stored in storage section 34.

Gas detection device 1 according to the embodiment described above includes infrared imaging section 21 that captures an image of an imaging target in an infrared region that is influenced by light absorption by gas; visible light imaging section 22 that captures an image of the imaging target in a wavelength region that is not influenced by light absorption by gas; display processing section 31b that causes display screen 32a to display gas image 7a captured by infrared imaging section 21 and visible image 7b captured by visible light imaging section 22; and display position change section 31d that changes at least one of first display position P1 of a specific position included in infrared image 7c and second display position P2 of the specific position included in visible image 7b on display screen 32a. Display processing section 31b causes first display position P1 and second display position P2 to be displayed on display screen 32a in such a manner that first display position P1 and second display position P2 can be compared with each other so as to recognize the difference δ between first display position P1 and second display position P2. Thus, first display position P1 and second display position P2 can be matched while first display position P1 and second display position P2 are displayed by comparing the positions. Consequently, the user can accurately estimate a gas leak position.

In gas detection device 1 according to the embodiment described above, display processing section 31b causes infrared image 7c and visible image 7b to be alternately displayed. Thus, the user can easily recognize the difference between first display position P1 of the specific position included in infrared image 7c and second display position P2 of the specific position included in visible image 7b.

While display processing section 31b causes infrared image 7c and visible image 7b to be alternately displayed, the present invention is not limited to this example, as long as infrared image 7c and visible image 7b can be displayed in such a manner that the images can be compared with each other. For example, gas image 7a and visible image 7b may be displayed in a superimposed manner. In this case, the button 335 (see FIG. 2) is a button for switching the superimposed display.

Further, in the main setting of the coordinate transformation matrix, according to the embodiment described above, the second coordinate transformation matrix is created based on the movement amount (amount of change by display position change section 31d) by movement amount input section 33a, and the second coordinate transformation matrix is operated on infrared image 7c transformed by the first transformation matrix, thereby transforming infrared image 7c. However, infrared image 7c may be transformed by updating the first transformation matrix based on the movement amount (amount of change by display position change section 31d) by movement amount input section 33a by using a parameter update unit instead of the second coordinate transformation section. Furthermore, gas image 7a and visible image 7b may be displayed, instead of infrared image 7c, in such a manner that the images can be compared with each other.

Although embodiments of the present invention have been described and illustrated in detail, the disclosed embodiments are made for purposes of illustration and example only and not limitation. The scope of the present invention should be interpreted by terms of the appended claims.

What is claimed is:

1. A gas detection device, comprising:
a first imager configured to capture a first image of an imaging target in an infrared region that is influenced by light absorption by gas;
a second imager configured to capture a second image of the imaging target in a wavelength range that is not influenced by light absorption by gas;
a hardware processor configured to:
cause a display screen to display a first displayed image, corresponding to at least a portion of the first image captured by the first imager, and
cause a display screen to display a second displayed image, corresponding to at least a portion of the second image captured by the second imager; and
a movement amount inputter configured to input a movement amount and a movement direction to change at least one of a first display position of a specific position included in the first displayed image and a second display position of the specific position included in the second displayed image on the display screen,
wherein the hardware processor is further configured to cause the display screen to display a whole part of the first displayed image and a whole part of the second displayed image temporally alternately to provide a visually recognizable indication of any difference between the first display position and the second display position, and
wherein the hardware processor is further configured to cause the display screen to change at least one of the first display position and the second display position based on the movement amount and the movement direction and display the first displayed image and the second displayed image.

2. The gas detection device according to claim 1, wherein the hardware processor is further configured to cause the second image captured by the second imager and a gas image extracted by performing image processing on the first image captured by the first imager to be superimposed and displayed.

3. The gas detection device according to claim 1, wherein the second imager is a visible light camera.

4. The gas detection device according to claim 1, further comprising:

an operation inputter configured to input positions of a plurality of feature points in the first displayed image and a plurality of feature points in the second displayed image, wherein the hardware processor converts coordinates of at least one of the first displayed image and the second displayed image based on the input positions of the feature points and a predetermined distance to reduce a disparity between the first displayed image and the second displayed image, and causes the display screen to display the first displayed image and the second displayed image temporally alternately based on the conversion.

5. The gas detection device according to claim 4, wherein the predetermined distance is a distance input from the operation inputter.

6. An information processing device, comprising:

a hardware processor configured to cause a display screen to display a first displayed image, corresponding to at least a portion of a first image of an imaging target captured in an infrared region that is influenced by light absorption by gas, and to display a second displayed image, corresponding to at least a portion of a second image of the imaging target captured in a wavelength range that is not influenced by light absorption by gas; and a movement amount inputter configured to input a movement amount and a movement direction to change at least one of a first display position of a specific position included in the first displayed image and a second display position of the specific position included in the second displayed image on the display screen, wherein the hardware processor is further configured to cause the display screen to display a whole part of the first displayed image and a whole part of the second displayed image temporally alternately to provide a visually recognizable indication of any difference between the first display position and the second display position, and wherein the hardware processor is further configured to cause the display screen to change at least one of the first display position and the second display position based on the movement amount and the movement direction and display the first displayed image and the second displayed image.

7. A non-transitory computer-readable storage medium storing a program causing a computer to perform an entire or part of processing for causing a display screen to display a first displayed image, corresponding to at least a portion of a first image of an imaging target captured in an infrared region that is influenced by light absorption by gas, and to display a second displayed image, corresponding to at least a portion of a second image of the imaging target captured in a wavelength range that is not influenced by light absorption by gas, changing, based on an input of a movement amount inputter of a movement amount and a movement direction, at least one of a first display position of a specific position included in the first displayed image and a second display position of the specific position included in the second displayed image on the display screen, causing the display screen to display a whole part of the first displayed image and a whole part of the second displayed image temporally alternately to provide a visually recognizable indication of any difference between the first display position and the second display position, and causing the display screen to change at least one of the first display position and the second display position based on the movement amount and the movement direction and display the first displayed image and the second displayed image.

\* \* \* \* \*